United States Patent [19]

Haselkorn et al.

[11] 4,168,189

[45] Sep. 18, 1979

[54] PROCESS OF PRODUCING AN ELECTRICALLY INSULATIVE FILM

[75] Inventors: Michael H. Haselkorn, Franklin, Ohio

[73] Assignees: Armco Inc., Middletown, Ohio

[21] Appl. No.: 925,424

[22] Filed: Jul. 17, 1978

Related U.S. Application Data

[63] Continuation-in-part of Ser. No. 798,855, May 20, 1977, abandoned.

[51] Int. Cl.[2] .......... H01F 1/04; B60T 8/02

[52] U.S. Cl. .......... 148/113; 148/31.5; 148/122

[58] Field of Search .......... 148/16, 27, 31.5, 31.55, 148/111, 112, 113, 122; 427/127, 130

[56] References Cited

U.S. PATENT DOCUMENTS

| | | | |
|---|---|---|---|
| 2,394,047 | 2/1946 | Elsey et al. | 148/111 |
| 3,222,228 | 12/1965 | Stanley et al. | 148/16 |
| 3,583,887 | 6/1971 | Steger et al. | 148/113 |
| 3,676,227 | 7/1972 | Matsumoto et al. | 148/111 |
| 3,697,322 | 10/1972 | Lee et al. | 148/102 |
| 3,700,506 | 10/1972 | Tanaka et al. | 148/111 |
| 3,764,406 | 10/1973 | Littmann | 148/111 |
| 3,785,879 | 1/1974 | Lee et al. | 148/27 |
| 3,841,925 | 10/1974 | Steger | 148/113 |
| 3,855,019 | 12/1974 | Salsgiver | 148/31.55 |
| 3,873,381 | 3/1976 | Jackson | 148/113 |
| 3,932,202 | 1/1976 | Lee et al. | 148/113 |
| 3,936,095 | 2/1976 | Every | 303/115 X |
| 3,941,621 | 3/1976 | Lee et al. | 148/31.5 |
| 3,945,862 | 3/1976 | Lee et al. | 148/113 |
| 3,956,029 | 5/1976 | Yamamoto et al. | 148/27 |
| 3,981,543 | 9/1976 | Atkins | 303/115 X |
| 4,010,050 | 3/1977 | Choby | 148/113 |
| 4,030,950 | 6/1977 | Shilling | 148/112 |

FOREIGN PATENT DOCUMENTS 1398504 6/1975 United Kingdom .

*Primary Examiner*—L. Dewayne Rutledge
*Assistant Examiner*—John P. Sheehan
*Attorney, Agent, or Firm*—Frost & Jacobs

[57] ABSTRACT

A process of producing an electrically insulative glass film on cold reduced silicon steel strip or sheet stock which will have a magnetic permeability greater than 1850 at 796 A/m after a final high temperature anneal which develops cube-on-edge orientation, which comprises applying an aqueous slurry containing magnesia, at least one boron compound, and up to 20% titanium dioxide, based on the weight of magnesia, drying the coating, and subjecting the coated stock to said final anneal, the total boron content being proportioned within the range of about 0.07% to about 0.30%, based on the weight of magnesia, in accordance with any two of the three parameters: particle size distribution, citric acid activity, and surface area, i.e., inversely to the bulk density of the dried coating. Improved core loss characteristics are obtained without sacrifice of permeability values.

13 Claims, 3 Drawing Figures

PROCESS OF PRODUCING AN ELECTRICALLY INSULATIVE FILM

CROSS REFERENCE TO RELATED APPLICATION

This application is a continuation-in-part of application Ser. No. 798,855 filed May 20, 1977, in the name of Michael H. Haselkorn, now abandoned.

BRIEF SUMMARY OF THE INVENTION

This invention relates to the production of cube-on-edge oriented silicon steel strip or sheet material having very high magnetic permeability (greater than 1850 at 796 A/m) and more particularly to a process of providing the strip or sheet material with a thin, continuous electrically insulative glass film. The process of the invention involves proportioning the amount of boron in a magnesia annealing separator composition, in relation to any two of the particle size distribution, citric acid activity (as hereinafter defined), and surface area of the magnesia, whereby to obtain improved core loss characteristics and improved glass film formation, while maintaining very high permeability, in the production of silicon steel strip and sheet stock having the cube-on-edge orientation.

The production of silicon steel strip or sheet material having very high permeability is disclosed in U.S. Pat. Nos. 3,873,381 and 3,855,019. In U.S. Pat. No. 3,873,381 critical amounts of boron and nitrogen are added to the silicon steel melt, along with the conventional additions of manganese and sulfur (or selenium) to obtain very high permeability. U.S. Pat. No. 3,855,019 discloses a copper addition to silicon steel melt, in which aluminum nitride is also present as a primary grain growth inhibitor, to obtain improved permeability values.

U.S. Pat. No. 3,676,227 issued July 11, 1972, to F. Matsumoto et al, (assigned to Nippon Steel Corporation) discloses a process of producing cube-on-edge oriented silicon steel, containing less than 4% silicon and 0.010% to 0.065% acid soluble aluminum, having very high permeability and "low iron loss" (i.e., low core loss), which includes applying an aqueous slurry of an annealing separator composition to the surface of cold reduced, decarburized silicon steel stock, drying the separator composition, and subjecting the stock to a final anneal at a temperature above 1000° C. for more than 5 hours in hydrogen or nitrogen. The annealing separator may be magnesium oxide, calcium oxide, aluminum oxide, titanium dioxide or mixtures thereof, and contains from 0.01% to 1.0% by weight boron or boron compound, based on the weight of annealing separator.

U.S. Pat. No. 3,700,506 discloses the addition of a boron compound to a magnetic separator composition, which also contains titanium, maganese and sulfur, for use on a silicon steel containing aluminum nitride.

The addition of boron compounds to magnesium oxide annealing separator composition is also disclosed in British Pat. No. 1,398,504; in U.S. Pat. Nos. 3,583,887, and 3,841,925 assigned to Morton Norwich Products, Inc.; in U.S. Pat. Nos. 3,697,322, 3,785,879, 3,932,202, 3,941.621 and 3,945,862 assigned to Merck & Co., Inc.; and in U.S. Pat. No. 4,010,050.

A number of the above patents are concerned with improving the electrically insulative glass film formation and Franklin resistivity, by means of boron compound additions, in silicon steel stocks which would have permeabilities less than 1850 at 796 A/m. Such materials ordinarily do not contain significant amounts of acid soluble aluminum, and hence do not relate to the same technology required of very high permeability (i.e., greater than 1850 at 796 A/m) material, for reasons explained hereinafter.

U.S. Pat. No. 3,956,029, issued to J. Yamamoto et al, discloses a magnesia annealing separator having specified ranges of bulk density (prior to mixing with water) and particle size distribution, for heat treatment of silicon steel other than very high permeability grades. There is no suggestion in this patent of addition of boron or boron compounds to the magnesia. Satisfactory results were obtained only by blending of laboratory-prepared batches of magnesia, a practice incapable of application to large scale commercial production.

It has been found that a magnesia from a Japanese source, containing about 0.08% boron based on the weight of magnesia, produced excellent glass film coated steels both from the standpoint of the physical properties of the glass film and the magnetic properties of the final silicon steel stock, in the production of very high permeability, cube-on-edge oriented material. However, it was found to be impossible to reproduce these results, and to obtain consistently high permeability, low core loss, and good glass film properties in magnesia from domestic sources with boron additions of the same magnitude. Investigations showed that variations in sodium, calcium and chloride contents of the magnesias had little effect. On the other hand, variations in citric acid activity or surface area were found to have a pronounced effect.

Citric acid activity is a measure of the hydration rate of magnesium oxide and is determined by measuring the time required for a given weight of a magnesia to provide hydroxyl ions sufficient to neutralize a given weight of citric acid. The test is the same as that reported in U.S. Pat. No. 3,841,925, viz.;

1. 100 ml of 0.400 normal aqueous citric acid containing 2 ml of 1% phenolphthalein indicator is brought to 30° C. in an 8 ounce wide mouth jar. The jar is fitted with a screw cap and a magnetic stirrer bar.

2. Magnesia weighing 2.00 g is admitted to the jar, and a stop watch is started at the same instant.

3. As soon as the magnesia sample is added the lid is screwed on the jar. At the 5 second point the jar and contents are vigorously shaken. Shaking is terminated at the 10 second point.

4. At the 10 second point the sample is placed on a magnetic stirrer assembly. Mechanical stirring should produce a vortex about 2 cm deep at the center when the inside diameter of the jar is 6 cm.

5. The stop watch is stopped at the instant the suspension turns pink, and the time is noted. This time in seconds is the citric acid activity.

It is evident that a low value represents a relatively active magnesia, i.e., one which hydrates rapidly. The rate of hydration is of greater significance than the eventual degree of hydration, although a high rate usually also indicates a high degree of hydration at equilibrium.

Despite the fact that hydration rate and surface area were thus known to affect the performance of magnesia, it was found that specifying a particular citric acid activity or surface area range still did not achieve uniformly reproducible results, particularly with respect to magnesias from different domestic sources. Even different batches of magnesia from the same domestic source were found to cause difficulties of one type or another despite citric acid activity or surface area values which, according to prior art teachings, should have been optimum.

In view of the above background it is evident that attempts to improve magnetic properties of very high permeability silicon steel by addition of about 0.08% boron to a domestic source of magnesia were at best only occasionally successful, and performance was unpredictable.

It is a principal object of the present invention to provide a process which solves the above problems in the production of silicon steels having very high permeability in accordance with any of the above United States Patents.

It is known that boron, added to a magnesia coating, is volatile at the final high annealing temperature (at or about 1200° C.), with part of the boron diffusing inwardly through the surfaces of the silicon steel stock, and the remainder escaping into the annealing atmosphere where it is ineffective. It has now been found that the amount of boron which volatilizes into the annealing atmosphere is a direct function of the bulk density or packing factor of the dried magnesia coating. (It will be understood that the coating is applied as an aqueous slurry by any conventional method such as dipping, spraying, metering rolls, or the like, and is then dried at relatively low heat.) The bulk density or packing factor is in turn directly dependent on the particle size distribution and degree of hydration of the magnesia.

In connection with hydration, it will be recognized that formation of magnesium hydroxide lowers the density and changes the morphology of the original magnesia particles. The water of hydration is not driven off by the relatively low heat used in the drying of the coating. However, this water is driven off by heating to a higher temperature, such as occurs in the high temperature final anneal, thus increasing the porosity of the magnesia coating. This is the reason for the direct effect of the degree of hydration on bulk density.

With respect to the effect of particle size distribution on packing or bulk density, reference may be made to FIG. 3.2 of "Introduction to Ceramics" by W. D. Kingery, J. Wiley & Sons, Inc. (1960), the disclosure of which is incorporated herein by reference.

A critical relation has been found to exist between particle size distribution and total boron content, viz., that the amount of boron addition should be directly proportional to the percentage of particles which lie within the 5 to 2 micron size range and the percentage of particles which are within the less than 1 micron size range.

More specifically, if the ratio of the percentage of particles between 5 and 2 microns (inclusive) to the percentage of particles less than 1 micron is between 1 and 2, the total boron addition should be from 0.07% to 0.1% by weight, based on the weight of magnesia.

If the ratio of the percentage of particles between 5 and 2 microns (inclusive) to the percentage of particles less than 1 micron is less than 1, the boron addition should be from 0.10% to 0.15%, based on the weight of magnesia.

If the ratio of the percentage of particles between 5 and 2 microns (inclusive) to the percentage of particles less than 1 micron is greater than 2, the boron addition should be from 0.15% to 0.30%, based on the weight of magnesia.

For convenience the terms "particle size distribution" and "particle size distribution ratio" will be used hereinafter to designate the ratio of the percentage of particles within the 5 to 2 micron (inclusive) size range to the percentage of particles less than 1 micron.

Surface area is also of importance in determining the activity or hydration rate of the magnesia. The desired activity in turn results in good "coatability" on the silicon steel surface. Very finely divided material (with high surface area) tends to hydrate rapidly with consequent undesirable decrease in the bulk density of the dried coating, for reasons explained above. Material having too coarse a particle size and a very low surface area tends to settle out of the aqueous slurry and does not readily undergo reaction with silica during the final high temperature anneal.

Although the citric acid activity of magnesia can be controlled, at least within broad limits, the particle size distribution is dependent on the particular manner of production and cannot be easily varied by domestic producers. In view of this, the novel concept of the present invention is to compensate for different particle size distributions, which produce different as dried magnesia coating densities, by proportioning the amount of boron addition inversely to the bulk density or packing factor of the dried magnesia coating.

Because of the thinness of the dried coating and relative roughness of the surface of the silicon steel stock, it is not possible to determine the bulk density of the dried coating with currently available equipment or techniques. Hence the boron addition is proportioned to the three parameters which directly affect the bulk density, viz., particle size distribution, surface area and degree of hydration, as determined by citric acid activity.

For control purposes, it has been found that if any two of the three parameters are within specified ranges (to be defined hereinafter), the third parameter will automatically be satisfactory and can be disregarded. Since particle size distribution cannot readily be varied by the producers of magnesia, as indicated above, it is therefore convenient to vary the boron addition either in direct proportion to the citric acid activity or in inverse proportion to the surface area, for a given particle size distribution. Alternatively, if both citric acid activity and surface area are controlled within certain limits, particle size distribution can be ignored.

It has been found that good adherence of a dried magnesia coating on silicon steel surfaces usually produces a coating with a high bulk density which will thus require a relatively low boron addition.

It has further been found that the tightness or tension in the winding of a coil during the final high temperature anneal can affect the amount of boron required. Loose laps or convolutions allow more boron to escape into the annealing atmosphere.

According to the invention there is provided a method of improving the core loss characteristics of cube-on-edge oriented silicon steel strip and sheet stock which will have a magnetic permeability greater than 1850 at 796 A/m after a final high temperature box anneal is a hydrogen-containing reducing atmosphere, which comprises adding a boron compound to an aqueous magnesia slurry, applying said slurry to the surface of the stock, and drying the so applied coating prior to the final anneal, the boron compound being added to provide a total boron content within the range of about 0.07% to about 0.30%, based on the weight of the magnesia, in inverse proportion to the bulk density of the dried coating, whereby to cause a substantially uniform amount of boron to diffuse inwardly through the magnesia coating during said final anneal, irrespective of the amount of boron volatilized into the annealing atmosphere from the coating.

Broadly, for a total boron content between 0.07% and 0.30% by weight, based on the weight of magnesia, the boron addition is proportioned directly to a citric acid activity ranging from greater than 50 to about 200 seconds, and proportioned inversely to a surface area ranging from about 5 to about 35 square meters per gram ($m^2/g$) regardless of particle size distribution.

The total boron content should be within the range of about 0.10% to about 0.15% for a particle size distribution ratio of less than 1, in direct proportion to a citric acid activity ranging from greater than 50 to about 120 seconds, or in inverse proportion to a surface area ranging from about 20 to 30 square meters per gram ($m^2/g$). The total boron content should be within the range of about 0.15% to about 0.30% for a particle size distribution ratio of greater than 2, in direct proportion to a citric acid activity ranging from greater than 50 to about 200 seconds, or in inverse proportion to a surface area ranging from about 7 to 19 $m^2/g$.

BRIEF DESCRIPTION OF THE DRAWINGS

Reference is made to the accompanying drawings wherein.

DETAILED DESCRIPTION

Figure 1:
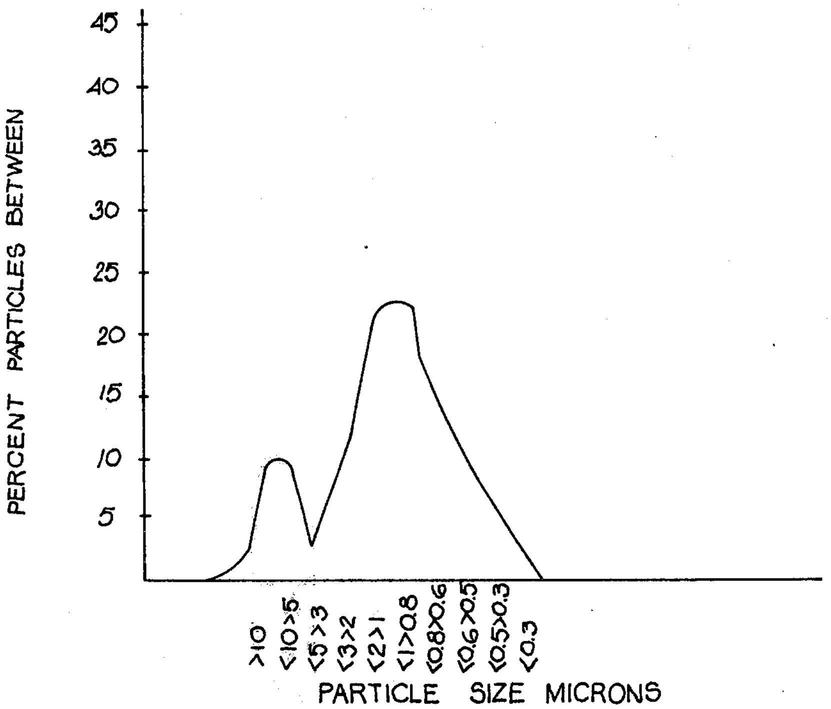
FIG. 1 is a graphic representation of particle size distribution of a prior art magnesia from a first source.

By way of example, this invention provides a process for the production of silicon steel strip and sheet stock having a magnetic permeability greater than 1850 at 796 A/m, including the steps of providing a cold reduced, decarburized silicon steel strip and sheet stock containing from about 2% to about 4% silicon, and from about 0.010% to about 0.065% acid soluble aluminum, applying to the surfaces of the stock an aqueous slurry comprising magnesia, at least one boron compound, and up to 20% titanium dioxide based on the weight of magnesia, drying the so applied slurry to form a dried coating on the surfaces, and subjecting the coated stock to a final anneal at a temperature of about 1095° to about 1260° C. in a hydrogen-containing reducing atmosphere, whereby to form an insulative glass film and to develop a cube-on-edge orientation by secondary recrystallization, the amount of said boron compound in the slurry being proportioned to provide a total boron content ranging from about 0.07% to about 0.30% based on the weight of magnesia, in accordance with any two of particle size distribution, surface area and citric acid activity of the magnesium oxide. The process of the invention will result in production of a thin, continuous glass film and will improve the core loss characteristics while obtaining very high permeabilty.

The cold reduced, decarburized silicon steel stock typically contains from about 2% to about 4% silicon, about 0.01% to about 0.15% manganese, about 0.002% to about 0.005% carbon, about 0.01% to about 0.03% sulfur, up to about 0.010% boron, about 0.005% to about 0.010% nitrogen, about 0.010% to about 0.065% acid soluble aluminum, and balance essentially iron.

It should be understood that a thin continuous glass film is advantageous in promoting improved magnetic quality, better space factor, better magnetostriction, and better adherence. Additionally, where applying a secondary coating such as the type disclosed in U.S. Pat. No. 3,840,378 to James D. Evans, a glass film must be thin and continuous in order to obtain good adherence of the secondary coating and to permit the tension-imparting characteristics to be realized.

The thickness of the dried magnesia coating cannot be accurately determined for the same reasons explained above with respect to determination of bulk density of the coating. Accordingly, the coating weight of the dried coating is used for control purposes, and a dried coating which will form a continuous thin glass film having the above described advantageous properties will be formed with a dried coating weight of about 0.02 to 0.05 ounce per square foot (6.3 to 15.6 $g/m^2$) for a magnesia having a citric acid activity of greater than 50 seconds.

A cold reduced decarburized silicon steel strip and sheet stock may be prepared by a conventional process wherein a suitable melt is cast as ingots or continuously cast into slab form. If cast as ingots the steel is bloomed and slabbed in conventional manner, and the slabs are hot rolled to intermediate thickness from a temperature of about 1260° to about 1400° C. with annealing after hot rolling. The hot mill scale is then removed, and the material is cold rolled to final gauge in one or more stages, followed by decarburization in a hydrogen atmosphere.

If the steel is continuously cast into slab form having a columnar grain structure, the method disclosed in U.S. Pat. No. 3,764,406, to M. F. Littmann, is preferably followed. In this process, a continuous-cast slab having a thickness of about 10 to about 30 centimeters is heated to a temperature between 750° and 1250° C., and initially hot reduced with a reduction in thickness of 5% to 50%, prior to reheating the slab to a temperature between about 1260° and 1400° C. for conventional hot rolling. The hot rolling, annealling, cold reduction and decarburization then follow in the manner described above.

The cold reduced and decarburized material is then coated with an aqueous magnesia slurry by dipping, spraying, or metering rolls and dried by heating to a temperature on the order of about 200°-300° C. to obtain a dried coating weight of 0.02 to 0.05 ounces per square foot (6.3 to 15.65 $g/m^2$). The coated strip or sheet material is then subjected to a final high temperature anneal, which may be a box anneal or an open coil anneal.

A convenient aqueous slurry concentration, when using metering rolls, ranges between about 0.8 and about 1.6 pounds of magnesia per gallon of water (0.096 to 0.192 g per cc). Up to 20% titanium dioxide, and perferably about 5%, may be added to the slurry based on the weight of magnesia.

The final high temperature anneal during which the cube-on-edge orientation is produced by secondary recrystallization in known manner is carried out at about 1095° to about 1260° C. in a reducing atmosphere for a period of time up to about 30 hours. It will be understood that the magnesia reacts with silicon in the steel to form a glass film in this anneal. The heat-up portion of the final anneal is preferably conducted in a nitrogen-hydrogen atmosphere in order to optimize formation of nitrides which act as grain growth inhibitors. The final portion of the anneal, which includes soaking at temperature and cool-down, is preferably conducted in hydrogen since this is known for purification of the steel to promote secondary recrystallization.

The type of boron compound and the point at which it is added has been found to be of no particular significance. Boric acid, calcium borate, or other commonly available boron compounds may thus be used. The compounds may be added to the magnesia before or during the processing thereof, or may be added after an aqueous slurry has been formed. It is also possible to apply a boron compound to the strip surfaces before applying the magnesia slurry thereto. Accordingly, the term "adding a boron compound to an aqueous magnesia slurry", as used herein, is to be construed as broad enough to cover addition or application of the boron compound at any stage prior to application of the slurry to the silicon steel stock surfaces.

Referring to FIG. 1 the particle size distribution of a magnesia of the first source is illustrated. It will be noted that two peaks or humps occur with about 10% of the particles between 5 and 10 microns and about 22% between 0.8 and 2 microns. Magnesia from this source typically exhibits particle size distribution as follows, in weight percent:

8–10% between 5 and 10 microns
30–40% between 5 and 2 microns
20–30% between 2 and 1 microns
18–40% less than 1 micron.

Figure 3:
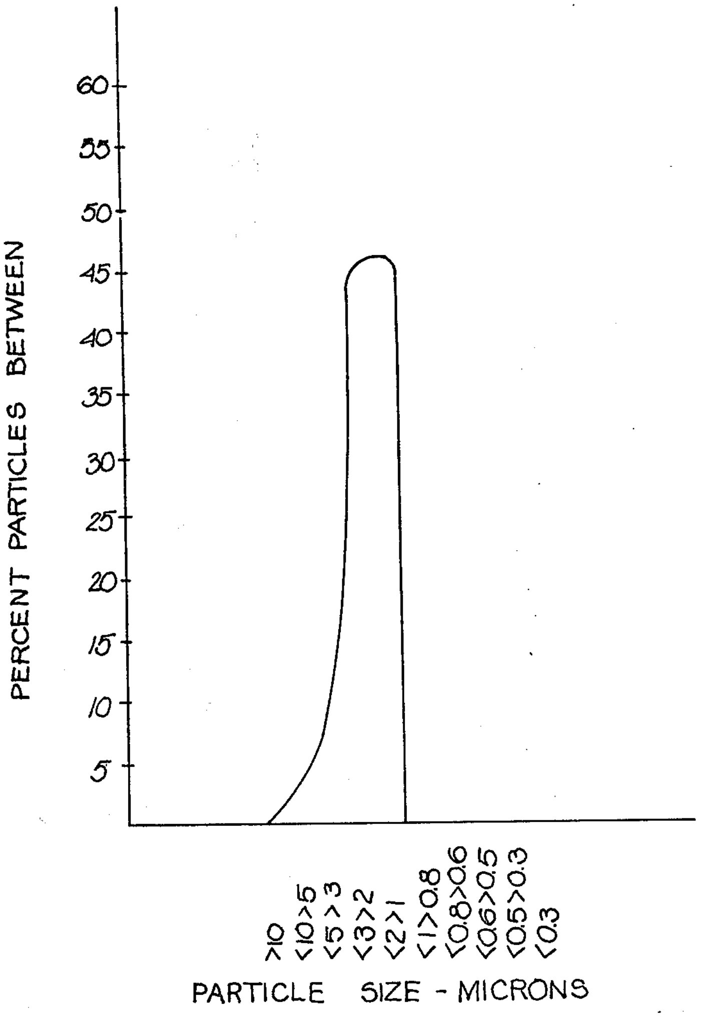
FIG. 3 is a graphic representation of particle size distribution of a magnesia from a third source.

A particle size distribution of the type illustrated in FIG. 1 approaches a two-component system as shown in FIG. 3.2 of the above mentioned "Introduction to Ceramics". The ratio of particles between 5 and 2 microns to particles less than 1 micron is between 1 and 2. Hence the magnesia of FIG. 1 forms a relatively dense dried coating. Magnesia can be obtained from this source having a citric acid activity of greater than 50 seconds. The surface area is 10 to 15 $M^2/g$. A nominal 0.08% boron addition has been found to give excellent results.

Figure 2:
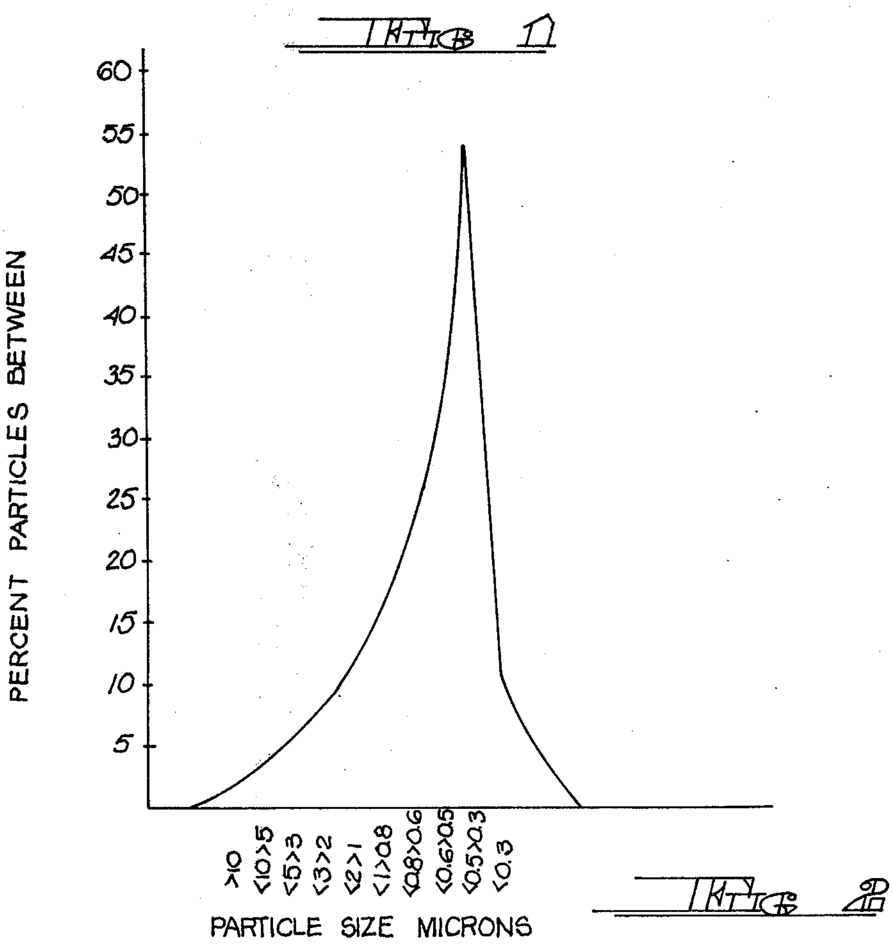
FIG. 2 is a graphic representation of particle size distribution of a magnesia from a second source.

FIG. 2 represents particle size distribution in a magnesia from a second source in which there is some spread of sizes among relatively large and relatively small particles, but with a great preponderance less than 1 micron. The ratio of particles between 5 and 2 microns to particles less than 1 micron is less than 1. Typical particle size distributions from this source are as follows:

0–5% between 5 and 10 microns
5–10% between 5 and 2 microns
5–10% between 2 and 1 microns
75–90% less than 1 micron, with 50–60% between 0.3 and 0.5 micron.

A magnesia of the type shown in FIG. 2 forms a less dense dried coating than that of FIG. 1. Accordingly, it has been found that about 0.10% to about 0.15% boron, based on the weight of magnesia, is needed for magnesia of the type of FIG. 2, with a citric acid activity greater than 50 seconds, in order to compensate for the boron lost into the annealing atmosphere during the final anneal, when the particle size distribution ratio is less than 1. Citric acid activity may range from about 55 to about 120 seconds for magnesia from this source. The surface area is 20 to 30 $m^2/g$.

FIG. 3 represents the particle size distribution of a magnesia from a third source. It will be noted that there is very little "scatter" into relatively large and small particle sizes and that a great preponderance lies within the size range of 2 to 5 microns. The ratio of particles between 5 and 2 microns to particles less than 1 micron is greater than 2. Typical particle size distributions for magnesia from this source are as follows:

0–5% between 5 and 10 microns
80–90% between 5 and 2 microns
10–20% between 2 and 1 microns
0% less than 1 micron It was found that the bulk density of dried coatings of the magnesia shown in FIG. 3 was relatively low and less than either of those of FIGS. 1 and 2. Accordingly, it was found that a broad boron range of about 0.15% to 0.30% (preferably from 0.15% to 0.20%) was necessary, together with a citric acid activity greater than 50 seconds, in order to compensate for boron lost into the annealing atmosphere, when the particle size distribution ratio is greater than 2. Citric acid activity may range from about 60 to about 200 seconds for magnesia from this source. The surface area is 7 to 19 $m^2/g$.

The composition of the silicon steel set forth above is generally conventional and has been found to be critical in order to obtain optimum magnetic properties. The presence of manganese sulfide and aluminum nitride within the specified ranges are necessary for preferential grain growth during the final high temperature anneal, which may have a total duration of about 8 to about 30 hours. Although not required, boron may be added to the silicon steel melt along with nitrogen in critical amounts, in accordance with the teachings of U.S. Pat. No. 3,873,381 issued to J. M. Jackson. These boron and nitrogen additions to the steel melt are for the purpose of controlling grain growth during the primary grain growth stage of the final anneal.

On the other hand, U.S. Pat. No. 3,700,506 discloses the addition of a boron compound to a magnetic separator composition, which also contains titanium, manganese, and sulfur or selenium, in order to control secondary grain growth during the final anneal, in a silicon steel containing aluminum nitride as a primary grain growth inhibitor.

The presence of aluminum in the silicon steel results in the formation of a small amount of aluminum oxide on the surface of the silicon steel, which makes formation of a thin, adherent and continuous glass film more difficult. However, the addition of titanium dioxide within the range of about 5% to 20% minimizes this difficulty.

A series of tests have been made, all of which were conducted with cold reduced, decarburized silicon steel strip stock having a composition within the ranges of about 2% to about 4% silicon, about 0.01% to about 0.15% manganese, about 0.002% to about 0.005% carbon, about 0.01% to about 0.03% sulfur, about 0.005% to about 0.010% nitrogen, about 0.010% to about 0.065% acid soluble aluminum, up to about 0.010% boron and balance iron plus incidental impurities.

The magnesia from the first soruce (FIG. 1) was used throughout the tests as a standard for comparison since it has been successfully used for several years at a nominal boron content of about 0.08% (total).

Test data are set forth in the Tables herein. Table I contains the source designations, citric acid activity, surface area, coating weight (dried coating) and boron content of the various samples. It will be understood that the source designations refer to the three sources which are plotted in FIGS. 1–3 with respect to particle size distribution.

Table II summarizes the magnetic properties of coated and annealed coils of Table I samples. All values reported in Table II represent averages of front and back specimens of coils corrected to a thickness of 11.6 mils. All the magnesia coating slurries contained 5% titanium dioxide, based on the weight of magnesia, and slurry concentration ranged from about 0.7 to about 1 pound magnesia per gallon of water (0.085 to 0.121 g per cc).

Sample B, from Source 2, presented no problems with respect to coating. The slurry wet the strip and produced a smooth even coating on both surfaces. Hydration of the magnesia in the aqueous slurry did not occur readily, and the adherence of the dried coating was good. The magnetic properties were comparable to those of its control Sample A, from Source 1, thus indicating that the boron content of 0.12% for Sample B was close to the optimum.

Sample D, from Source 3, which also containted 0.12% boron, also developed no coating problems. The slurry wet both surfaces well and produced an excellent dried coating, although the adherence of the dried coating was fair, rather than good. The glass film after the final anneal was smooth, continuous and light gray in appearance. However, the core loss of Sample D did not duplicate that of its control Sample C, from Source 1, the difference of 0.047 watts/kg being considered significant. The permeability was also somewhat lower than that of the control Sample C. It is therefore evident that the optimum boron content for Sample D would be greater than 0.12% boron.

Samples F and G from Source 2 were the same magnesia containing 0.07% boron applied at two different coating weights of 7.6 and 20.8 g/m$^2$, respectively. These indicate that coating weight is a variable which can effect final magnetic properties. The low coating weight of Sample F produced a thin, discontinuous glass film containing only a few small sulfide particles. The thicker glass film of Sample G contained a large number of large sulfide particles, and the subsurface silica particles were large and relatively few in number. However, neither of Samples F and G duplicated its control Sample E (from Source 1) in core loss values or in permeabilty. This indicated that the boron level of 0.07% was insufficient.

TABLE 1

| Sample | Source | C.A.A. (seconds) | Surface area (m$^2$/g | Coating Weight (g/m$^2$) | Total % Boron (based on wt. MgO) |
|---|---|---|---|---|---|
| A | 1 | 67 | 13.5 | 11.64 | 0.08 |
| B | 2 | 65 | 24.0 | 17 | 0.12 |
| C | 1 | 67 | 13.5 | 11.64 | 0.08 |
| D | 3 | 57 | 10 | 13 | 0.12 |
| E | 1 | 67 | 13.5 | 11.64 | 0.08 |
| F | 2 | 36 | 30.0 | 7.6 | 0.07 |
| G | 2 | 36 | 30.0 | 20.8 | 0.07 |

TABLE II

| Sample | Source | Core Loss (watts/kg) 1.7 Tesla | Permeability at 796A/m |
|---|---|---|---|
| A | 1 | 1.388 | 1916 |
| B | 2 | 1.397 | 1918 |
| C | 1 | 1.388 | 1916 |
| D | 3 | 1.435 | 1910 |
| E | 1 | 1.418 | 1922 |
| F | 2 | 1.438 | 1917 |

TABLE II-continued

| Sample | Source | Core Loss (watts/kg) 1.7 Tesla | Permeability at 796A/m |
|---|---|---|---|
| G | 2 | 1.485 | 1916 |

Variation in magnetic properties as a function of boron content (at several citric acid activity values) was shown by laboratory evaluations of several magnesias from the second source, having the particle size distribution of FIG. 2. These results are summarized in Table III. A magnesia from the first source (Sample H, Source 1) was used as a control for comparison with Samples J and K, while another magnesia batch from the first source (Sample L) was used as a control for comparison with Samples M through R.

For Samples J, K, M, N & O the surface areas were between 20 and 30 m$^2$/g. For Samples P, Q and R the surface areas were between 30 and 40 m$^2$/g.

TABLE III

| Sample | Source | Total % Boron | C.A.A. (Seconds) | (watts/kg) 1.7 Tesla | Permeability at 796 A/m |
|---|---|---|---|---|---|
| H | 1 | 0.077 | 59 | 1.485 | 1918 |
| J | 2 | 0.08 | 62 | 1.479 | 1920 |
| K | 2 | 0.13 | 62 | 1.420 | 1930 |
| L | 1 | 0.08 | 62 | 1.535 | 1919 |
| M | 2 | 0.077 | 80 | 1.605 | 1912 |
| N | 2 | 0.10 | 80 | 1.485 | 1932 |
| O | 2 | 0.12 | 80 | 1.545 | 1927 |
| P | 2 | 0.077 | 36 | 1.595 | 1915 |
| Q | 2 | 0.10 | 36 | 1.579 | 1919 |
| R | 2 | 0.12 | 36 | 1.511 | 1931 |

Accordingly, the boron range of 0.10% to 0.30% is to be considered critical, and this is demonstrated by further laboratory evaluations performed on a magnesia from the second source, having a citric acid activity of 72 seconds, to which boron was added in amounts of 0.03%, 0.08%, 0.15%, 0.20%, 0.25%, and 0.30%, respectively, based on the weight of magnesia. The magnetic properties of the specimens were as follows:

| Total % Boron | Core Loss (watts/kg) 1.7 Tesla | Permeability at 796 A/m |
|---|---|---|
| 0.03 | 1.488 | 1930 |
| 0.08 | 1.436 | 1936 |
| 0.15 | 1.450 | 1927 |
| 0.20 | 1.450 | 1917 |
| 0.25 | 1.462 | 1913 |
| 0.30 | 1.608 | 1926 |

It is evident that the optimum boron range for the above sample was from 0.08 to 0.20%.

In addition to magnetic properties, a number of other factors are of importance in the formation of an electrically insulative glass film. Among these are the viscosity of the magnesia slurry, wettability of the stock surfaces by the aqueous slurry, and thickness, smoothness and physical appearance of the glass film.

Viscosity ordinarily is not a problem for slurry concentrations ranging between 0.8 and 1.6 pounds of magnesia per gallon of water, unless the hydration rate is high. Under these conditions, the viscosity gradually increases during the course of a run as the magnesia gradually hydrates to a greater extent. This results in excessive ignition losses of the dried coating and an undesirable thick glass film. This can be avoided in the practice of the present invention by insuring a citric acid activity of greater than 50 seconds, or a surface area not greater than 35 $m^2/g$, which will reduce the hydration rate sufficiently. When viscosity increases, it is more difficult to get a smooth, even, as dried magnesia coating. Streaking of the coating may result with high viscosity.

Thickness of the glass film and the reasons for control thereof have been discussed above. It should suffice to reiterate that control of any two of particle size distribution, citric acid activity and surface area in accordance with the invention results in the formation of a desirable thin, continuous glass film. Similarly, smoothness of the glass-metal interface is attained either directly or indirectly by control of these parameters.

With respect to physical appearance of the film, discoloration usually occurs as a result of iron oxide formation. Excessive water present in the coating during the final anneal will usually produce a porous glass film which will not protect the steel and will not prevent iron oxide formation. Again this is controlled in the practice of the present invention by providing a citric acid activity of greater than 50 seconds and/or a surface area not greater than 35 $m^2/g$, thereby minimizing hydration.

In summary, for a magnesia having a particle size distribution ratio typical of that illustrated in FIG. 2, a citric acid activity of greater than 50 seconds to about 120 seconds, and/or a surface area of 20 to 30 $m^2/g$, a boron addition of about 0.10% to about 0.15%, based on the weight of magnesia, gives excellent results. For a magnesia having a particle size distribution ratio typical of that illustrated in FIG. 3, a citric acid activity of greater than 50 to about 200 seconds, and/or a surface area of 7 to 19 $m^2/g$, a boron addition of about 0.15% to about 0.30%, based on the weight of magnesia, gives excellent results.

It is therefore apparent that the process hereinabove described achieves the principal objectives of the invention. While the invention has been described in the preferred embodiments, it will be evident that modifications may be made without departing from the spirit and scope thereof, and no limitations are to be inferred except as set forth in the appended claims.

What is claimed is:

1. A method of improving the core loss characteristics of cube-on-edge oriented silicon steel strip and sheet stock which will have a magnetic permeability greater than 1850 at 796 A/m after a final high temperature anneal in a hydrogen-containing reducing atmosphere, which comprises adding a boron compound to an aqueous magnesia slurry, applying said slurry to the surface of said stock, and drying the so applied coating prior to said final anneal, said boron compound being added to provide a total boron content within the range of about 0.07% to about 0.30%, based on the weight of magnesia, in inverse proportion to the bulk density of the dried coating, whereby to cause a substantially uniform amount of boron to diffuse inwardly through the magnesia coating during said final anneal, irrespective of the amount of boron volatilized in the annealing atmosphere from said coating.

2. The method claimed in claim 1, wherein the total boron content is proportioned in accordance with any two of particle size distribution ratio, citric acid activity, and surface area of said magnesia.

3. The method claimed in claim 2, wherein said total boron content is proportioned directly to a citric acid activity ranging from greater than 50 to about 200 seconds, and inversely to a surface area ranging from about 5 to about 35 square meters per gram.

4. The method claimed in claim 2, wherein said total boron content is within the range of about 0.10% to about 0.15% for a particle size distribution ratio less than 1 and in direct proportion to a citric acid activity ranging from greater than 50 to about 120 seconds.

5. The method claimed in claim 2, wherein said total boron content is within the range of about 0.10% to about 0.15% for a particle size distribution ratio less than 1 and in inverse proportion to a surface area ranging from about 20 to about 30 square meters per gram.

6. The method claimed in claim 2, wherein said total boron content is within the range of about 0.15% to about 0.30% for a particle size distribution ratio greater than 2 and in direct proportion to a citric acid activity ranging from greater than 50 to about 200 seconds.

7. The method claimed in claim 2, wherein said total boron content is within the range of about 0.15% to 0.30% for a particle size distribution ratio greater than 2 and in inverse proportion to a surface area ranging from about 7 to 19 square meters per gram.

8. The method claimed in claim 2, wherein boron is added within the range of about 0.10% to about 0.15%, in direct proportion to a citric acid activity of said magnesium oxide ranging from greater than 50 to about 120 seconds, and when the particle size distribution is as follows:

0–5% between 5 and 10 microns
5–10% between 5 and 2 microns
5–10% between 2 and 1 microns
75–90% less than 1 micron.

9. The method claimed in claim 2, wherein boron is added within the range of about 0.15% to about 0.20%, in direct proportion to a citric acid activity of said magnesium oxide ranging from greater than 50 to about 200 seconds, and when the particle size distribution is as follows:

0–5% between 5 and 10 microns
80–90% between 5 and 2 microns
10–20% between 2 and 1 microns
0% less than 1 micron 10. The method claimed in claim 1, wherein said slurry contains up to 20% titanium dioxide, based on the weight of magnesia.

11. The method claimed in claim 1, wherein said slurry is applied in an amount sufficient to provide a dried coating weight of about 0.02 to about 0.05 ounce per square foot, whereby to form a thin continuous glass film during said final anneal.

12. The method claimed in claim 1, wherein said silicon steel stock in the decarburized condition contains from about 2% to about 4% silicon, about 0.01% to about 0.15% manganese, about 0.002% to about 0.005% carbon, about 0.01% to about 0.03% sulfur, up to about 0.010% boron, about 0.005% to about 0.010% nitrogen, about 0.010% to about 0.065% acid soluble aluminum, and balance essentially iron.

13. The method claimed in claim 1, wherein said silicon steel stock contains from about 2% to about 4% silicon and from about 0.010% to about 0.065% acid soluble aluminum, wherein said aqueous magnesia slurry contains up to 20% titanium dioxide based on the weight of magnesia, and wherein said final anneal is conducted at a temperature of about 1095° to about 1260° C.

* * * * *